(12) United States Patent
McCabe et al.

(10) Patent No.: US 9,156,488 B1
(45) Date of Patent: Oct. 13, 2015

(54) MOUNTING BRACE ASSEMBLY FOR STEERING COLUMN MEMBER

(71) Applicant: VAN-ROB INC., Aurora (CA)

(72) Inventors: David John McCabe, Markham (CA); Sacheen Bekah, Richmond Hill (CA); Sorinel Bodirlau, Toronto (CA); Wayne Wing Chun Wong, Richmond Hill (CA)

( * ) Notice: Subject to any disclaimer, the term of this patent is extended or adjusted under 35 U.S.C. 154(b) by 22 days.

(21) Appl. No.: 14/308,938

(22) Filed: Jun. 19, 2014

(51) Int. Cl.
*B62D 1/16* (2006.01)

(52) U.S. Cl.
CPC .................................. *B62D 1/16* (2013.01)

(58) Field of Classification Search
CPC ...... B62D 1/16; B62D 25/081; B62D 25/145; B60K 2350/943; B60K 37/00
USPC ........... 180/90; 280/779; 296/192, 193.02, 72
See application file for complete search history.

(56) References Cited

U.S. PATENT DOCUMENTS

| | | | |
|---|---|---|---|
| 5,564,769 A * | 10/1996 | Deneau et al. | 296/72 |
| 5,676,216 A * | 10/1997 | Palma et al. | 180/90 |
| 5,934,733 A * | 8/1999 | Manwaring | 296/72 |
| 6,391,470 B1 * | 5/2002 | Schmieder et al. | 428/598 |
| 6,554,352 B2 * | 4/2003 | Nagy | 296/203.02 |
| 6,988,764 B2 * | 1/2006 | Matsutani | 296/193.02 |
| 7,086,665 B2 * | 8/2006 | Lee | 280/779 |
| 7,344,158 B2 * | 3/2008 | Lee et al. | 280/779 |
| 7,784,187 B2 * | 8/2010 | Scheib et al. | 29/897.2 |
| 8,029,045 B2 * | 10/2011 | Merkle et al. | 296/193.02 |
| 8,100,463 B2 * | 1/2012 | Penner et al. | 296/193.02 |
| 8,146,986 B2 | 4/2012 | Bierkamp et al. | |
| 8,256,830 B2 | 9/2012 | Hitz et al. | |
| 2009/0302641 A1 | 12/2009 | Bierkamp et al. | |
| 2011/0278876 A1 | 11/2011 | Hitz et al. | |
| 2013/0076016 A1 * | 3/2013 | Aoki | 280/779 |

FOREIGN PATENT DOCUMENTS

DE 102009026299 12/2012

* cited by examiner

*Primary Examiner* — Laura Freedman

(57) ABSTRACT

There is provided in a preferred embodiment a mounting brace assembly for securing a steering column member to a vehicle cross-support member in a position braced against a vehicle cowl top. The assembly includes a cowl top bracket for engaging the vehicle cowl top, and a mounting base arm extending longitudinally along a base axis from a first axial end portion to a second axial end portion. The base arm includes an anchor flange sized for generally upward mated insertion in at least part of a flange receiving slot. The cowl top bracket is coupled to the base arm proximal to a vehicle forward end, and includes a load transfer portion shaped for juxtaposed abutment with a load bearing portion of the vehicle cowl top. Contact between the cowl top bracket and the vehicle cowl top transfers rotational bearing forces from the assembly towards the vehicle cowl top.

24 Claims, 6 Drawing Sheets

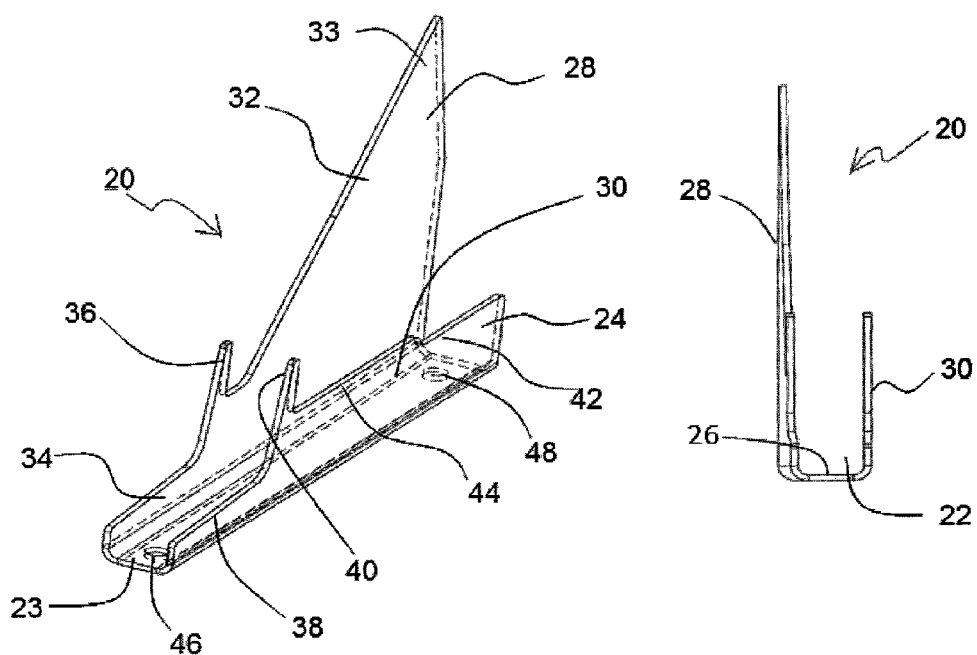
FIGURE 3
FIGURE 4
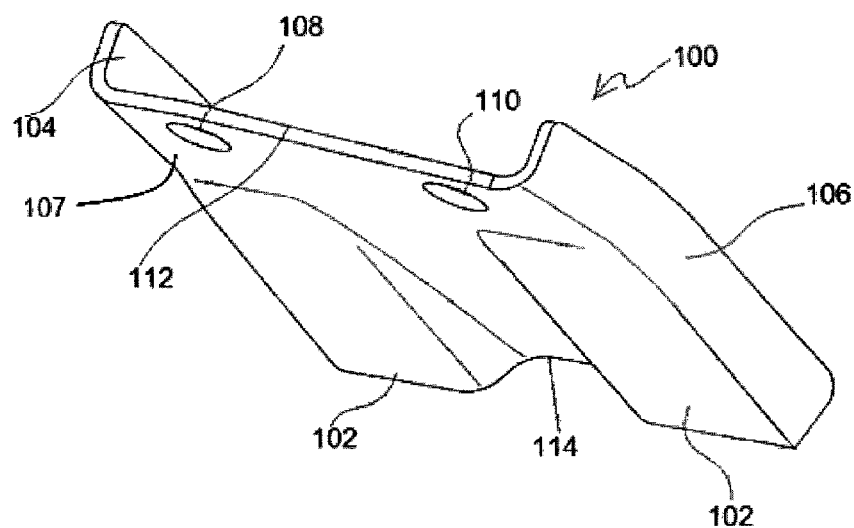
FIGURE 5

MOUNTING BRACE ASSEMBLY FOR STEERING COLUMN MEMBER

FIELD OF THE INVENTION

This invention relates to a mounting brace assembly adapted for securing a steering column member to a vehicle cross-support member, most preferably in a position braced against a vehicle cowl top. The invention further relates to a mounting brace arrangement which includes a pair of mounting base arms coupled to associated mounting locations provided on a vehicle cross-support member.

BACKGROUND OF THE INVENTION

In the automobile industry, vehicle cross-support members, crossbeams, cross car beams, and other similar components (collectively referred hereinafter as "vehicle cross-support members" or "cross-support members") are utilized as part of the vehicular body structure. The vehicle cross-support member normally spans between or fastened to a pair of laterally disposed vertical pillars, or A-pillars, in the region generally below the windscreen and a cowl top, and between a forward engine compartment and a rearward passenger compartment, so as to extend in a direction transverse to the length of an automobile. As part of a motor vehicle body, the cross-support member provides for cross car stiffness and rigidity against for example side load impacts.

Located forwardly of the driver and the front-row passenger, the cross-support member also supports or provides mounting surfaces for various vehicle components, including an instrument panel, a glove and/or storage compartment, a center console, a dashboard and a steering column member. Although direct attachment may be possible, various attachment devices or assemblies could be utilized to effect attachment of such vehicle components to the cross-support member. The attachment devices and assemblies are preferably designed such that the noise and vibrations transferring from the vehicle engine, drivetrain, transmission or any other moving parts are reduced for optimal passenger comfort. For vehicle components subject to or exerting a load or force, the attachment devices and assemblies preferably incorporate constructions adapted for improving load transfer, dispersion and/or distribution. Reduction of weight and production costs are also of important consideration in designing and implementing the attachment devices and assemblies.

A number of attachment or mounting assemblies for securing a steering column member in a vehicle are known. By way of an example, U.S. Pat. No. 8,256,830 to Hitz describes a plurality of standardized support arms, a number of which are configured in the form of steering column support arms each having a U-shaped cross section defined by a pair of legs. Each of the legs forming part of the steering column support arm of Hitz include an area secured in a preformed transversal slot of a vehicle cross-support member on the driver side. Hitz furthermore describes reinforcement members having the same U-shaped cross section, and which are coupled to the steering column support arms to form a rectangular cross section. Hitz suggests that the standardized support arms may alternatively be formed as other support or reinforcement components secured to the cross-support member, such as a transmission tunnel support arm and a splash shield support arm, so as to permit reduction of production costs associated with fabricating multiple vehicle components.

U.S. Pat. No. 8,146,986 to Bierkamp describes a holder configured for attachment to a tubular vehicle cross-support member to effect securement of different vehicle components. The holder of Bierkamp possesses a U shaped configuration defined by two limbs interconnected by a bridge, and which are sized to be received in a parallel spaced slots transversely oriented to a longitudinal axis of the cross-support member. Bierkamp suggests that two or more holders may be secured to the cross-support member to effect steering column attachment. The specific configuration of the holder of Bierkamp is described as advantageous in that it allows for sliding and rotational adjustment or positioning of the holder on the tubular cross-support member prior securing or welding the holder thereto.

The attachment devices described in Hitz and Bierkamp may suffer disadvantages in that forces generated by a steering column member, such as rotational forces, may not be transferred or distributed efficiently to other structural elements of the vehicle. Furthermore, as the generated forces are mainly channeled to the vehicle cross-support member, deficiencies in the attachment between the cross-support member and the devices of Hitz and Bierkamp may possibly lead to structural and/or functional failures. Given the increasing complexity and components included with steering column members, such as airbags and various control and adjustment elements, improvements to the load transfer and distribution from the steering column member may be desired.

SUMMARY OF THE INVENTION

One possible non-limiting object of the present invention is to provide a mounting brace assembly for securing a steering column member to a vehicle cross-support member, and which is for improving load transfer and distribution from the steering column member to other vehicle structural elements.

Another possible non-limiting object of the present invention is to provide a mounting brace assembly for securing a steering column member to a vehicle cross-support member, and which allows for structural reinforcement or connection between different structural elements of a vehicle.

Another possible non-limiting object of the present invention is to provide a mounting brace assembly which allows for more stabilized attachment of a steering column member, and which is for improving noise, vibration and harshness ("NVH") performance.

Another possible non-limiting object of the present invention is to provide a mounting brace assembly which allows for improved streamlined and precise installation on a cross-support member as part of an automated manufacturing process.

In view of the disadvantages of previously known devices, the present invention provides in one simplified aspect a mounting brace assembly adapted for securing a steering column member to a generally transversely extending vehicle cross-support member, and which includes a cowl top bracket, and a mounting base arm.

In another aspect, the present invention provides a mounting brace assembly adapted for securing a steering column member to a generally transversely extending vehicle cross-support member in a position braced against a vehicle cowl top, the cross-support member including at least one mounting location defining a flange receiving slot, wherein the mounting brace assembly comprises a cowl top bracket for engaging the vehicle cowl top, and at least one mounting base arm extending longitudinally along a base axis from a first axial end portion to a second axial end portion, the mounting brace assembly being positionable in a mounted orientation with the first axial end portion oriented towards a rearward vehicle end for securing the steering column member thereto, and the second axial end portion towards a vehicle forward end, the mounting base arm including a flange member formed as a generally planar anchor flange along the base axis, the anchor flange being sized for generally upward mated insertion in at least part of the flange receiving slot, and the cowl top bracket being coupled to the mounting base arm proximal to the vehicle forward end, and comprising a load transfer portion shaped for juxtaposed abutment with a load bearing portion of the vehicle cowl top, wherein in the mounted orientation, contact between the cowl top bracket and the vehicle cowl top transfers rotational bearing forces from the first axial end portion towards the vehicle cowl top.

In yet another aspect, the present invention provides a mounting brace assembly adapted for securing a steering column member to a generally transversely extending vehicle cross-support member in a position braced against a vehicle cowl top, the cross-support member including a pair of mounting locations spaced along a length of the cross-support member to define an inwardly spaced mounting region therebetween, each said mounting location defining a flange receiving slot, wherein the mounting brace assembly comprises a cowl top bracket for engaging the vehicle cowl top, and a pair of mounting base arms, each said mounting base arm extending longitudinally along a base axis from a first axial end portion to a second axial end portion, the mounting brace assembly being positionable in a mounted orientation with the first axial end portion oriented towards a rearward vehicle end for securing the steering column member thereto, and the second axial end portion towards a vehicle forward end, each said mounting base arm including a pair of generally parallel flange members each integrally joined along the base axis to an associated lateral edge of a longitudinally elongated base web: a first said flange member being formed as an abutment flange distal to the inwardly spaced mounting region, the abutment flange comprising a contact surface portion having a profile selected for complementary juxtaposed abutment against an underside of the cross-support member; and the second other said flange member being formed as a generally planar anchor flange proximal to the inwardly spaced mounting region, the anchor flange being sized for mated insertion in at least part of respective said flange receiving slot of an associated one of the mounting locations when the mounting brace assembly is in the mounted orientation; and the cowl top bracket being coupled to one or both said mounting base arms proximal to the vehicle forward end, and comprising a load transfer portion shaped for juxtaposed abutment with a load bearing portion of the vehicle cowl top, wherein in the mounted orientation, contact between the cowl top bracket and the vehicle cowl top transfers rotational bearing forces from the first axial end portion towards the vehicle cowl top.

In yet another aspect, the present invention provides a mounting brace arrangement adapted for securing a steering column member in a position braced against a vehicle cowl top, the mounting brace arrangement comprising a generally transversely extending vehicle cross-support member, a pair of mounting base arms, and a cowl top bracket for engaging the vehicle cowl top, the cross-support member including a pair of mounting locations spaced along a length of the cross-support member to define an inwardly spaced mounting region therebetween, each said mounting location defining a flange receiving slot, each said mounting base arm being coupled to the cross-support member at an associated one of the mounting locations, and extending longitudinally along a base axis from a first axial end portion to a second axial end portion, the mounting brace arrangement being positionable in a mounted orientation with the first axial end portion oriented towards a rearward vehicle end for securing the steering column member thereto, and the second axial end portion towards a vehicle forward end, each said mounting base arm including a pair of generally parallel flange members each integrally joined along the base axis to an associated lateral edge of a longitudinally elongated base web: a first said flange member being formed as an abutment flange, the abutment flange comprising a contact surface portion having a profile selected for complementary juxtaposed abutment against an underside of the cross-support member; and the second other said flange member being formed as a generally planar anchor flange sized for mated insertion in at least part of respective said flange receiving slot of the associated mounting location when the mounting brace arrangement is in the mounted orientation; and the cowl top bracket being formed as a laterally extending cowl top bracket coupled to both said mounting base arms in the inwardly spaced mounting region forwardly of the cross-support member, wherein the cowl top bracket comprises: an abutment edge portion in substantially abutting contact with an outer surface of the cross-support member; and a load transfer portion shaped for juxtaposed abutment with a load bearing portion of the vehicle cowl top, wherein in the mounted orientation, contact between the cowl top bracket and the vehicle cowl top transfers rotational bearing forces from the first axial end portion towards the vehicle cowl top.

In one embodiment, the mounting location defines two said flange receiving slots in a generally parallel orientation to each other, and the mounting base arm includes a longitudinally elongated base web and two said anchor flanges each integrally joined to an associated lateral edge portion of the base web, each said anchor flanges being sized for generally upward mated insertion in at least part of an associated one of the flange receiving slots. It is to be appreciated that alternatively, the two flange receiving slots may be disposed at an angle relative to each other, and furthermore, depending on the specific application of the mounting brace assembly, the two anchor flanges may or may not be identical to each other.

In an alternative embodiment, the mounting base arm further comprises a longitudinally elongated base web and an abutment flange, each of the abutment flange and the anchor flange being integrally joined along the base axis to an associated lateral edge portion of the base web, wherein the abutment flange comprises a contact surface portion having a profile selected for complementary juxtaposed abutment against an underside of the cross-support member. The contact surface portion most preferably comprises a longitudinal edge of the abutment flange, and the longitudinal edge is welded directly to the underside of the cross-support member in the mounted orientation.

Preferably, the flange receiving slot is cooperatively defined at least by adjoining bottom and forward end walls of the cross-support member, and the anchor flange comprises a bracket attachment surface portion coupled to the cowl top bracket, and an insertion surface portion located to be at least partially received in an interior of the cross-support member, wherein in the mounted orientation, the bracket attachment surface portion projects forwardly from the forward end wall. Most preferably, the anchor flange has a generally triangular shape, most preferably a perpendicular triangular shape, extending at an angle to the base axis towards the second axial end portion to form the bracket attachment surface portion, the anchor flange tapering towards the first axial end portion to form the insertion surface portion.

In one embodiment, the flange receiving slot is further cooperatively defined by a rearward end wall of the cross-support member, together with the bottom and forward end walls, and the anchor flange is sized for complementary mated insertion in the flange receiving slot, wherein in the mounted orientation, the anchor flange projects forwardly from the forward end wall and rearwardly from the rearward end wall.

In one embodiment, the mounting base arm further comprises a stop member in the first axial end portion, the stop member being located for resting against a rearward end wall of the cross-support member when the mounting brace assembly is in the mounted orientation to restrict or prevent forward longitudinal movement of the mounting base arm along the base axis. Preferably, the stop member comprises a generally co-planar projection protruding from a longitudinal edge of one or both said flange members, the projection being shaped for complementary juxtaposed contact with the rearward end wall.

The mounting base arm preferably further includes a reinforcement bridge member interposed between the flange members, the reinforcement bridge member being secured to respective mutually opposed surfaces or longitudinal seating edge portions of the flange members, most preferably in the first or second axial end portion. When secured to the opposed surface of the anchor flange and the longitudinal seating edge of the abutment flange in the second axial end portion, the mounting base arm preferably further comprises a reinforcement bolt having a bolt end portion for engaging the base web, and the reinforcement bridge member comprises a bridge plate defining a surface aperture sized to receive the reinforcement bolt, the reinforcement bolt being received in the aperture with the bolt end portion engaging the base web. The reinforcement bolt is most preferably secured or welded to both the bridge plate and the base web.

In one embodiment, an upper end wall of the cross-support member defines at least one tab receiving slot in generally vertical alignment with the flange receiving slot, and the anchor flange includes at least one substantially co-planar engagement tab sized to be received in the at least one tab receiving slot when the mounting brace assembly is in the mounted orientation. Preferably, the cross-support member defines an elongated interior cavity along a length of the cross-support member, and the anchor flange comprises a profile sized for mated juxtaposition within the elongated interior cavity. Most preferably, the profile is substantially identical to a cross section of the elongated interior cavity.

It is to be appreciated that the cross-support member for use with the mounting brace assembly, or forming part of the mounting brace arrangement is not particularly limited. The cross-support member may include a cross section having a shape such as but not limited to trapezoid, circle, ellipse, square, rectangle, triangle and pentagon, or incorporate a clamshell type construction. The cross-support member may be provided with a plurality of transverse sections along the length of the cross support member, for example, an enlarged transverse section located on the driver side and a reduced diameter transverse section on the passenger side, the two transverse sections joined by a generally vertically oriented center column.

In one embodiment, the mounting base arm further comprises a bracket positioning column removably mounted to the second axial end portion, and the cowl top bracket is secured to the bracket positioning column distal to the second axial end portion, the bracket positioning column being sized for positioning the load transfer portion in juxtaposed abutment with the load bearing portion when the mounting brace assembly is in the mounted orientation. Preferably, the bracket positioning column is positionable in the mounted orientation to extend generally vertically from the second axial end portion to form a seating surface, and the cowl top bracket is in seated engagement with the seating surface. Most preferably, each said mounting base arm comprises the bracket positioning column, each said bracket positioning column being angled towards the inwardly spaced mounting region to cooperatively define the seating surface, and the cowl top bracket is in seated engagement with the cooperatively defined seating surface. It is to be appreciated that depending on the relative position of the vehicle cowl top to the mounting brace assembly, the bracket positioning column may be angled in different directions.

Preferably, the mounting brace assembly comprises two said mounting base arms positionable in the mounted orientation at a distance from each other along a length of the cross-support member, and the cowl top bracket is coupled to one or both of the mounting base arms.

It is to be appreciated that the cowl top bracket is not particularly limited, provided the cowl top bracket provides for engagement between the mounting brace assembly and the vehicle cowl top. The cowl top bracket may incorporate different shapes, sizes and constructions, depending on for example environmental constraints, dimensions at the cowl top, attachment locations and direction of attachment. Most preferably, the cowl top bracket includes a single piece stamped metal construction having a U, W or L cross section.

In one embodiment, the cowl top bracket is formed as a laterally extending cowl top bracket coupled to both said mounting base arms, the cowl top bracket further comprising an abutment edge portion located for substantially abutting contact with an outer surface of the cross-support member. In an alternative embodiment, the mounting brace assembly comprises two said cowl top brackets each coupled to an associated one of the mounting base arms.

Most preferably, the flange receiving slot is cooperatively defined at least by adjoining bottom and forward end walls of the cross-support member, and the anchor flange has a generally triangular shape extending at an angle to the base axis towards the second axial end portion to form a bracket attachment surface portion, the anchor flange tapering towards the first axial end portion to form an insertion portion located to be at least partially received in an interior of the cross-support member in the mounted orientation, and wherein the cowl top bracket comprises a generally planar bracket plate having a pair of laterally disposed attachment flanges each coupled to associated said bracket attachment surface portion, the bracket plate having an inclination angle substantially identical to said angle to the base axis.

It is to be appreciated that engagement between the steering column member and the mounting brace assembly is not particularly limited. In one embodiment, the mounting base arm preferably further comprises a mounting plate interposed between the flange members in the first axial end portion, the mounting plate defining a threated bore or threaded nut for complementary threaded engagement with a threaded attachment bolt in the securement of the steering column member thereto. Where the mounting brace assembly includes a pair of the mounting base arms, two-point mounting of the steering column member in the inwardly spaced mounting region may be effected in the mounted orientation.

For more effective load transfer from the steering column member, each of the mounting base arms may be configured in an alternative embodiment to effect two-point mounting of the steering column member. For instance, the mounting base arm may preferably further comprise a second threaded attachment bolt or stud, and an anchor plate interposed between the flange members in the second axial end portion, the anchor plate defining a first surface aperture sized to receive the second threaded attachment bolt or stud, wherein the base web defines a second surface aperture in general alignment with the first surface aperture, and the second threaded attachment bolt or stud is inserted through the first and second surface apertures to form a threaded engagement end portion extending from the second surface aperture, the threaded engagement end portion being sized for complementary threaded engagement with a threaded nut or a threaded bore formed in the steering column member in the securement of the steering column member to the mounting base arm. Where the mounting brace assembly includes a pair of the mounting base arms, four-point mounting of the steering column member in the inwardly spaced mounting region may be effected in the mounted orientation. In such embodiment, contact between the cowl top bracket and the vehicle cowl top preferably transfers rotational bearing forces from the first and second axial end portions towards the vehicle cowl top.

It is to be appreciated that to avoid mechanical redundancies and reduce weight, the reinforcement bridge member (or bridge plate) and the reinforcement bolt in the second axial end portion as described above may operate or be formed as the anchor plate and the second threaded attachment bolt/stud, respectively. To form the second threaded attachment bolt/stud, the reinforcement bolt is modified to include the threaded engagement end portion to insert through and extend past the second surface aperture.

Preferably, the abutment flange is disposed distal to the inwardly spaced mounting region, and the anchor flange proximal to the inwardly spaced mounting region.

Most preferably, the mounting base arm and the cowl top bracket are welded together, and furthermore to the cross-support member and the cowl top in the mounted orientation to form a single integral unit. The welding method for forming the integral unit is not particular limited, as long as the method operates to couple the individual components. Such welding methods may include but not limited to electric resistance welding, shielded metal arc welding, gas metal arc welding, submerged arc welding, flux-cored arc welding, electroslag welding, laser beam welding, electron beam welding, electromagnetic pulse welding, friction stir welding, cold metal transfer welding and any other welding processes known in the relevant arts.

In an alternative embodiment, the mounting base arm, the cowl top, the cross-support member and/or the cowl top may be coupled using other known joining methods including but not limited to bonding, crimping, clinching, riveting and screwing.

The materials for preparing the individual components of the mounting brace assembly or arrangement are not particularly limited. Possible materials include steel, aluminum, iron, magnesium, carbon fiber, high strength polymers or plastics and any combinations or alloys thereof.

Additional and alternative features of the present invention will be apparent to a person skilled in the art from the following detailed description of the preferred embodiments thereof.

BRIEF DESCRIPTION OF THE DRAWINGS

Reference may now be had to the following detailed description taken together with the accompanying drawings in which:

FIG. 3 is a perspective view of a mounting base channel beam of the mounting brace assembly shown in FIG. 1;

FIG. 4 is an elevation view of the mounting base channel beam shown in FIG. 3;

FIG. 5 is a perspective view of a cowl top coupling plate of the mounting brace assembly shown in FIG. 1;

DETAILED DESCRIPTION OF THE PREFERRED EMBODIMENTS

Figure 1:
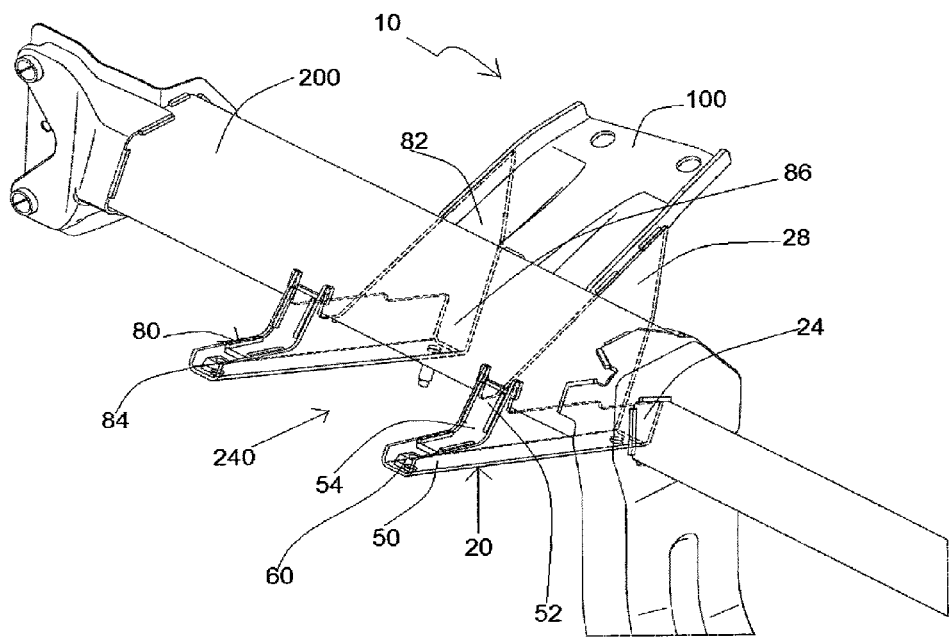
FIG. 1 is a perspective view of a mounting brace assembly in accordance with a preferred embodiment of the present invention, and which is shown as welded to a vehicle cross-support member.
Figure 2:
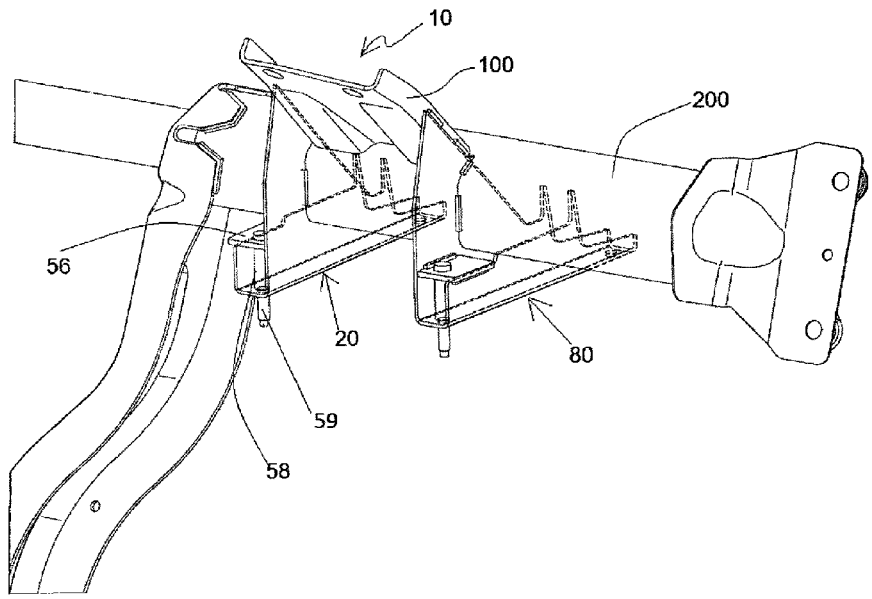
FIG. 2 is another perspective view of the mounting brace assembly shown in FIG. 1.

Reference is made to FIG. 1 which shows a perspective view of a mounting brace assembly 10 in accordance with a preferred embodiment of the present invention, and which is coupled to a vehicle cross-support member 200. As will be described in greater detail below, the mounting brace assembly 10 includes a pair of mounting base channel beams 20, 80, and a cowl top coupling plate 100. For greater clarity, FIG. 2 shows an additional perspective view of the channel beams 20, 80 and the cowl top coupling plate 100 welded to the cross-support member 200.

Reference is now made to FIG. 3 which illustrates a perspective view of the mounting base channel beam 20. The mounting base channel beam 20 forms a generally U-shaped channel 22 which extends longitudinally from a first axial end 23 to a second axial end 24. As seen in FIG. 4, the channel 22 includes a longitudinally extended base web 26 integrally joining at one lateral edge an anchor flange 28, and at the other lateral edge an engagement flange 30 oriented substantially parallel to the anchor flange 28. The anchor flange 28 includes a generally triangular profile section 32 in the second axial end 24, tapering from an apex 33 towards the first axial end 23. A first mounting arm profile section 34 of a reduced height from the base web 26 is included in the first axial end 23 to extend towards the second axial end 24. Disposed between the triangular and first mounting arm profile sections 32, 34 is a first stopping post profile section 36 formed as an upwardly extending protrusion. The profile sections 32, 34, 36 together form the anchor flange 28 as an integral coplanar unit. Similar to the anchor flange 28 the engagement flange 30 includes in the first axial end 23 a second mounting arm profile section 38, and stopping post profile section 40 adjacent to the second mounting arm profile section 38. The engagement flange 30 furthermore includes in the second axial end 24 a plate seat profile section 42, and located between the second stopping post profile section 40 and the seat profile section 42 is a cross-support member coupling profile section 44. The base web 26 defines in the first and second axial ends 23, 24 attachment bolt receiving apertures 46, 48, respectively.

The first and second mounting arm profile sections 34, 38 include identical dimensions, and, together with the adjoining portion of the base web 26 in the first axial end 23, form a cantilevered steering column mounting arm 50 for rearward securement of a steering column member thereto as will be further described below. Similarly, the first and second stopping post profile sections 36, 40 of identical dimensions and longitudinal position on the channel 22 cooperatively form a stopping post 52 for restricting longitudinal movement of the channel beam 20 and improved load transfer as also will be further described below.

As seen in FIG. 1, for added structural rigidity, a reinforcement bridge 54 is welded to mutually opposed surfaces of the anchor and engagement flanges 28, 30 along the mounting arm 50 and the stopping post 52 in the first axial end 23. As seen in FIG. 2, the channel beam 20 further includes an anchor bridge plate 56 welded to a longitudinal edge of the seat profile section 42 of the engagement flange 30, and an opposed surface of the anchor flange 28 in the second axial end 24. The anchor bridge plate 56 defines a surface aperture aligned with the attachment bolt receiving aperture 48 of the base web 26, and an attachment bolt 58 is fixedly received through the surface aperture and the attachment bolt receiving aperture 48. The attachment bolt 58 includes a dowel pin portion 59 extending from the attachment bolt receiving aperture 48 for securing the steering column member during operation as will be further described below. As seen in FIG. 1, the mounting arm 50 also includes a mounting plate 60 defining a threaded bore in alignment with the attachment bolt receiving aperture 46 of the base web 26.

Although not strictly limited, the channel beam 20 preferably extends longitudinally between about 20 cm and about 80 cm, and between about 2 cm and about 20 cm in width. The anchor flange 28 preferably extends between about 5 cm and about 40 cm from the base web 26 to the apex 33, and the triangular profile section 32 has an inclination angle between about 5° and about 70° relative to the channel 22. The first and second mounting arm profile section 34, 38 extends between about 1 cm and 5 cm from the base web 26, and the first and second stopping post profile sections 36, 40 between about 3 cm and 10 cm. The profile sections 42, 44 extend about 2 cm to 8 cm from the base web 26. The channel beam 20 is most preferably formed as a single piece stamped metal with a thickness between about 0.1 cm and about 1.0 cm.

The mounting base channel beam 80 is identical to the mounting base channel beam 20 as described above, except the channel beam 80 forms a mirrored image of the channel beam 20.

Reference is made to FIG. 5 which shows a perspective view of the cowl top coupling plate 100. The cowl top coupling plate 100 incorporates a generally planar single piece construction most preferably formed with one or more stamped reinforcing ridges or ribs 102 for increased planar structural rigidity. Formed along the two opposed lateral edges of the cowl top coupling plate 100 are lateral attachment flanges 104, 106. The coupling plate 100 includes a load transfer portion 107 adjacent to a first transverse edge 112, and which defines a pair of holes 108, 110 positioned for engaging a vehicle cowl top as will be further described below. A second transverse edge 114 opposite to the first transverse edge 112 is shaped for attachment to the cross-support member 200 as also will be further detailed below.

Although not particularly limited, the cowl top coupling plate 100 preferably measures between about 10 cm and about 50 cm in width, between about 15 cm and about 60 cm in length, and between about 0.1 cm and 1.0 cm in thickness.

Figure 6:
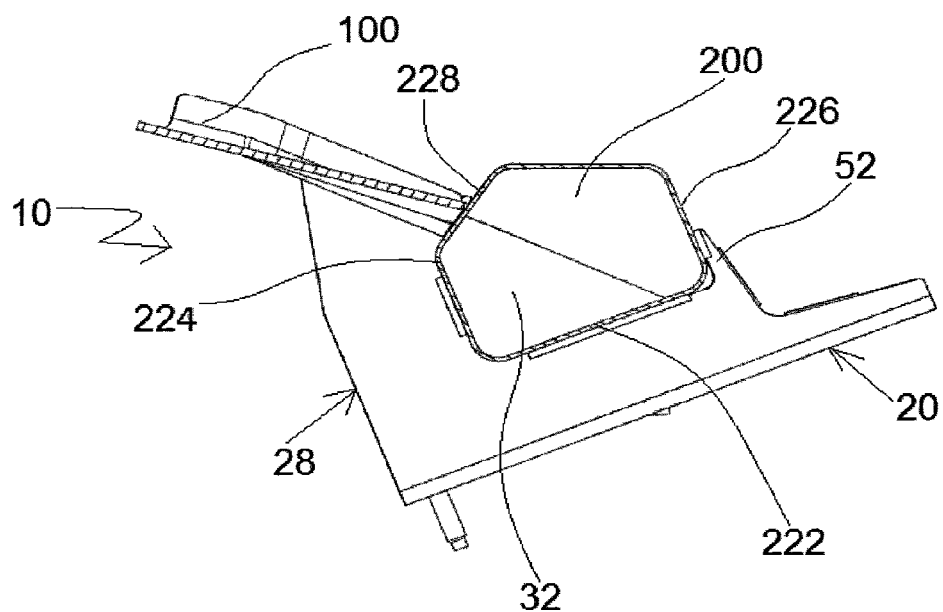
FIG. 6 is a cross-sectional side view of the mounting brace assembly shown in FIG. 1, and which is taken at a mid-point between the two mounting base channel beams.

For installation, as seen in FIGS. 1 and 6, the channel beams 20, 80 are welded to the cross-support member 200 along a length of the cross-support member 200 to define an interior mounting region 240 therebetween. In particular, the channel beam 20 is first positioned on the cross-support member 200 by partially inserting the triangular profile section 32 into an associated flange receiving slot (not explicitly shown) preformed on adjoining bottom and forward walls 222, 224 of the cross-support member 200, until the coupling profile section 44 is in contact with the bottom wall 222. As seen in FIG. 1, the channel beam 20 is oriented such that with the cross-support member 200 affixed transversely to a length of a vehicle, the anchor flange 28 is adjacent to the interior mounting region 240, and the steering column mounting arm 50 is positioned towards a rearward end of the vehicle, and the second axial end 24 towards a forward end of the vehicle below the vehicle cowl top (not shown). Furthermore, as seen in FIG. 6, when properly placed the stopping post 52 is in abutting contact with a rear wall 226 of cross-support member 200, preventing longitudinal forward movement of the channel beam 20. Most preferably, the triangular profile section 32 is sized to abut against longitudinal ends of the flange receiving slot when the stopping post 52 is in contact with the rear wall 226, so as to restrict both forward and rearward longitudinal movement of the channel beam 20. After proper placement, the channel beam 20 is welded in place to the cross-support member 200.

The other channel beam 80 is positioned and welded to the cross-support member 200 in a manner identical to that of the channel beam 20 as described above, with a respective anchor flange 82 being disposed adjacent to the interior mounting region 240, the respective first and second axial ends 84, 86 directed towards the rearward and forward ends of the vehicle, respectively.

With the channel beams 20, 80 welded to the cross-support member 200, the cowl top coupling plate 100 is positioned and welded to the triangular profile sections of the channel beams 20, 80 at the lateral attachment flanges 104, 106, such that an upper or lower surface of the load transfer portion 107 is in contact with the vehicle cowl top (not shown). The cowl top coupling plate 100 is joined to the cowl top preferably using threaded studs and/or bolts, or fastening rivets, received through the holes 108, 110. For more rigid attachment to the cross-support member 200, the second transverse edge 114 is welded to an adjacent angled top wall 228 of the cross-support member 200. As best seen in FIG. 6, when welded to the channel beams 20, 80 and the cross-support member, the plane of the coupling plate 100 has an inclination angle substantially identical to or less than the angle defined by an upper edge of the triangular profile section 32 from the base web 26.

For operation, a steering column member (not shown) is secured to the mounting brace assembly using four-point mounting configuration. To effect attachment, the steering column member is provided with a pair of reinforcement lateral sides, and an associated one of the reinforcement lateral sides is mounted to the mounting arm 50 of the channel beam 20 using a threaded attachment bolt inserted through the attachment bolt receiving aperture 46, and threadably engaged to the threaded bore of the mounting plate 60. The dowel pin portion 59 of the attachment bolt 58 extending generally downwardly in the second axial end 24 is inserted into a dowel pin receiving bore provided on the associated reinforcement lateral side of the steering column member to be secured thereon using an engagement nut. The opposite reinforcement lateral side of the steering column member is mounted to the channel beam 80 in a manner identical to that described above for the channel beam 20, such that the steering column member is positioned in the interior mounting region 240 between the channel beams 20, 80.

The applicant has appreciated that the mounting brace assembly 10 may permit improved transfer, dispersion and distribution of the load and forces, such as rotational, translational and torsional forces, generated from the attached steering column member towards the cross-support member 200 and the vehicle cowl top. Load transfer may for example further involve transferring of a portion of the steering column member loads received by the mounting arm 50 to the stopping post 52 and into the rearward wall 226 of the cross-support member 200.

It is to be appreciated that the channel beams 20, 80 are not particularly limited for installation in the preferred orientation seen in FIGS. 1 and 2. The channel beams 20, 80 may in the alternative be positioned such that one or both of the respective anchor flanges are disposed distal to the interior mounting region 240, depending on, for example, the attachment point to the vehicle cowl top, and the intended load distribution path from the channel beams 20, 80.

It is to be further appreciated that depending on the specific application, and the dimensions and requirements of the vehicle, various modifications and adjustments may be made to the mounting brace assembly of the present invention. By way of an alternative embodiment, FIG. 7 shows a mounting brace assembly 310 configured for installation in a vehicle with a generally vertically oriented attachment point on the vehicle cowl top.

Figure 7:
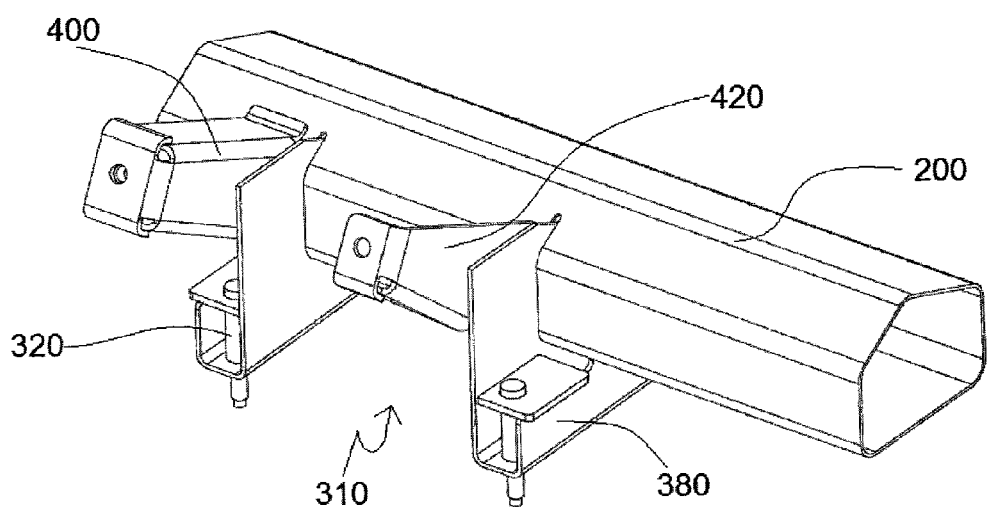
FIG. 7 is a perspective view of a mounting brace assembly in accordance with an alternative preferred embodiment of the present invention, and which is shown as coupled to a vehicle cross-support member.
Figure 8:
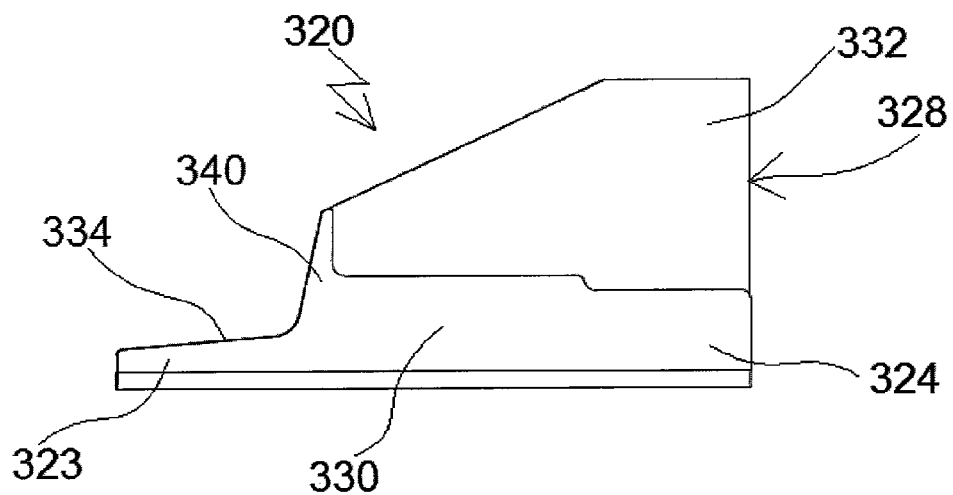
FIG. 8 is a side view of a mounting base channel beam of the mounting brace assembly shown in FIG. 7.

The mounting brace assembly 310 includes a pair of mounting base channel beams 320, 380, and is seen in FIG. 7 as coupled to the vehicle cross-support member 200. As seen in FIG. 8, the channel beam 320 is substantially identical to the channel beam 20 described above, with the exception that the channel beam 320 includes an anchor flange 328 which includes profile sections modified from those of the channel beam 20. In particular, the anchor flange 328 includes two profile sections, or namely a mounting arm profile section 334 in a first axial end 323, and which is integrally joined to an adjacent sloped profile section 332 extending to a second axial end 324. Unlike the channel beam 20, the anchor flange 328 does not include any stopping post profile section. Rather, a stopping post profile section 340 included with an engagement flange 330 of the channel beam 320 alone forms a stopping post positioned for contacting the rear wall 226 when the anchor flange 328 is positioned and welded to the cross-support member 200.

To accommodate the sloped profile section 332, the flange receiving slot preformed on the cross-support member 200 further extends to the rear wall 226. Although the anchor flange 328 is shown in FIG. 8 as having the two adjacent profile sections 332, 334, the anchor flange 328 may alternatively include only the sloped profile section 332 extending to the first axial end 323 for additional or modified load transfer path from the first axial end 323.

Figure 9:
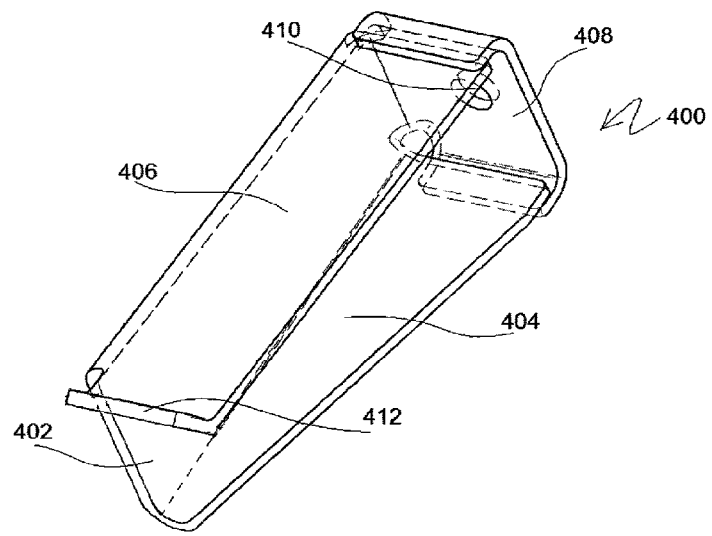
FIG. 9 is a perspective view of a cowl top bracket of the mounting brace assembly shown in FIG. 7.

The mounting brace assembly 310 is also different from the mounting brace assembly 10 in that two separate cowl top brackets 400, 420 are welded to the mounting base channel beams 320, 380, respectively. As seen in FIG. 9, the cowl top bracket 400 has a generally rectangular attachment plate 402 with a pair of laterally opposed return flanges 404, 406 and a transversely oriented cowl top coupling flange 408. The cowl top coupling flange 408 defines a fastener receiving aperture 410 for receiving a fastening rivet, stud or bolt in the securement of the mounting brace assembly 310 to the vehicle cowl top.

For installation, the channel beams 320, 380 are welded to the cross-support member 200 in a manner identical to that described above for the mounting brace assembly 10. The cowl top bracket 400 is coupled to the channel beam 320 by positioning and welding the attachment plate 402 to the sloped profile section 332 at an upper end surface facing away from the interior mounting region 240, such that the cowl top coupling flange 408 is in juxtaposed contact with the vertically oriented attachment point (not shown) on the vehicle cowl top. For increased rigidity, a reinforcing lip 412 provided on the return flange 406 is welded to the top wall 228 of the cross-support member 200. For illustration purposes, the cowl top bracket 420 is shown in FIG. 7 as a simplified variation of the cowl top bracket 400, and which may be more suited when requirements for local cross car rigidity are less severe, and reducing material and production time is preferred.

The cowl top brackets 400 and 420, in addition to the anchor bridge plate 56 and attachment bolt 58, allow for the production of single integral pre-assembly units by welding to the predetermined locations on the channel beams 320 and 380, respectively, and which may be prepared prior to installation on the cross-support member 200.

It is to be appreciated that the cowl top brackets 400, 420 may be attached to either surfaces of the respective anchor flanges of the channel beams 320, 380, depending on the specific location and geometry of the attachment point on the vehicle cowl top.

Figure 10:
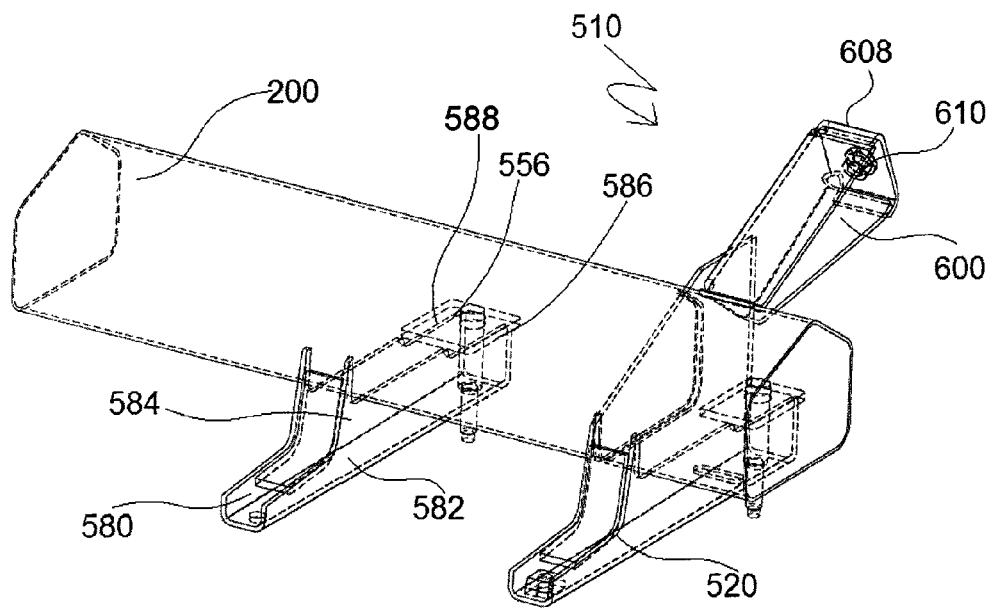
FIG. 10 is a perspective view of a mounting brace assembly in accordance with an alternative embodiment of the present invention, and which is shown as coupled to a vehicle cross-support member.

Reference is now made to FIG. 10 which illustrates as an alternative embodiment a mounting brace assembly 510 modified for application in a vehicle having a single attachment point on the cowl top. The mounting brace assembly 510 includes mounting base channel beams 520, 580 and a cowl top bracket 600. The channel beam 520 and the cowl top bracket 600 welded thereto are identical to the above-described channel beam 320 and the cowl top bracket 400, respectively, including a cowl top coupling flange 608 having a threaded nut 610 on a surface thereof. The threaded nut 610 is provided for complementary threaded engagement with a threaded cowl top attachment bolt (not shown) in the securement of the cowl top bracket 400 to the vehicle cowl top (not shown). Alternatively, only a hole may be present on the cowl top coupling flange 608, allowing for securement of the cowl top bracket 600 to the vehicle cowl top as described above for the cowl top bracket 400.

Furthermore, the mounting base channel beam 580 is identical to the channel beam 20 described above, except that the channel beam 580 includes two generally parallel engagement flanges 582, 584, both identical to the engagement flange 30 of the channel beam 20 described above. Given the absence of any anchor flange, the cross-support member 200 preferably does not include a flange receiving slot at the location where the channel beam 580 is coupled. Furthermore, as both of the engagement flanges 582, 584 include plate seat profile sections 586, 588, respectively, positionable forwardly of the cross-support member 200, the channel beam 580 includes a reinforcement plate 556 welded to respective longitudinal seating edges of the seat profile section 586, 588.

Figure 11:
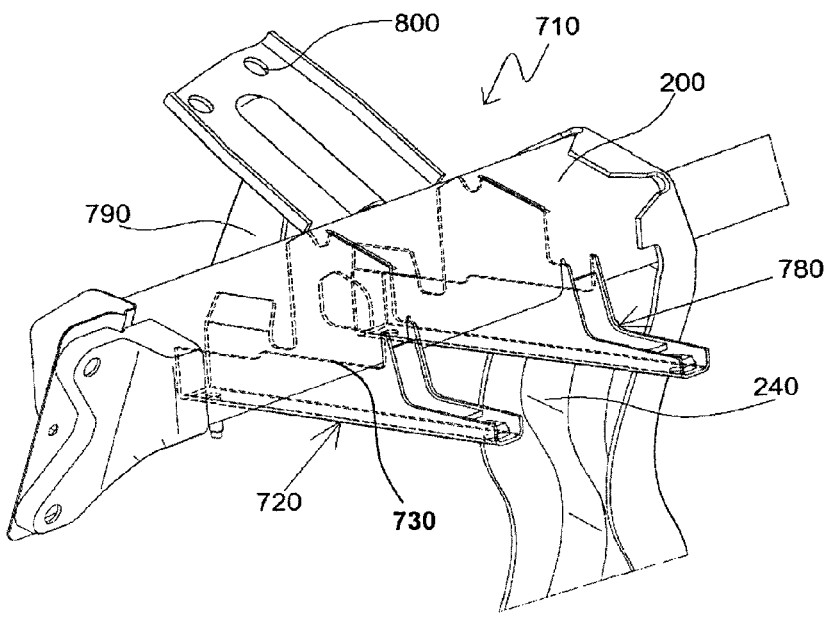
FIG. 11 is a perspective view of a mounting brace assembly in accordance with an alternative preferred embodiment of the present invention, and which is shown as coupled to a vehicle cross-support member.
Figure 13:
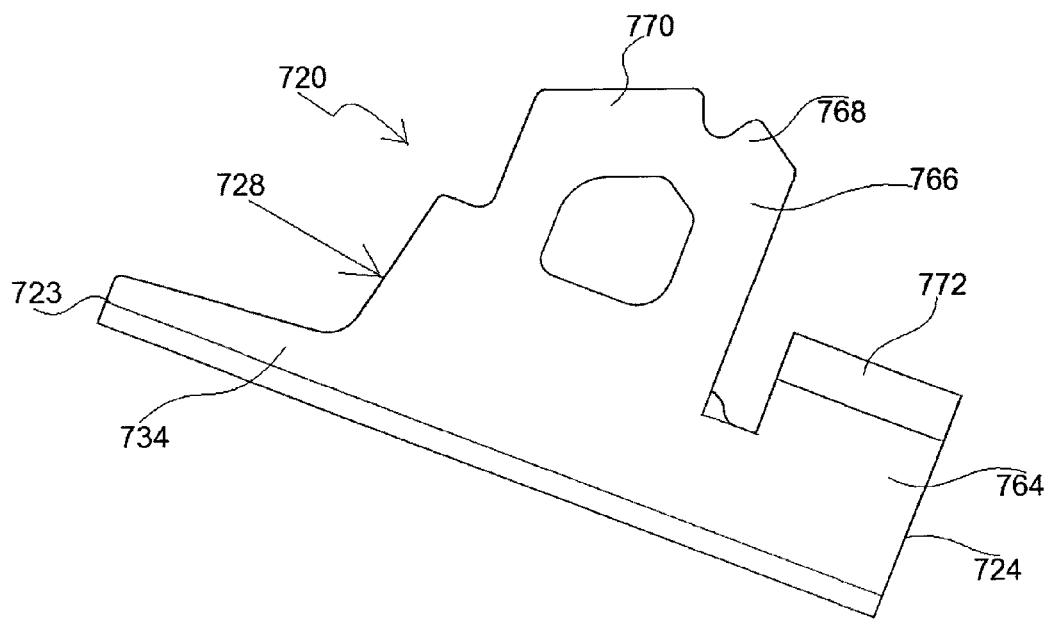
FIG. 13 is a side view of a mounting base channel beam of the mounting brace assembly shown in FIG. 11.

Reference is now made to FIG. 11 which illustrates as an alternative embodiment a mounting brace assembly 710 which incorporates modified constructions for added rigidity of the cross-support member 200. The mounting brace assembly 710 includes a pair of mounting base channel beams 720, 780, and a cowl top coupling bracket 800. As seen in FIG. 13, the channel beam 720 includes an anchor flange 728 having in a first axial end 723 a mounting arm profile section 734, a leg support profile section 764 in a second axial end 724, and a locating flange profile section 766 disposed between the profile sections 734, 764. The locating flange profile section 766 is provided with a couple of coplanar insertion tabs 768, 770 sized for mated insertion in associated tab receiving slots preformed on the top wall 228 and a second top wall 230, respectively, when the mounting brace assembly 710 is welded to the cross-support member 200. As seen in FIG. 11, the channel beam 720 furthermore includes an engagement flange 730 disposed parallel to the anchor flange 728, and which is identical to the engagement flange 30 described above, so as to include a plate seat profile section 742 in the second axial end 24. The leg support profile section 764 of the anchor flange 728 includes an end portion 772 angled away from the opposed engagement flange 730.

Figure 12:
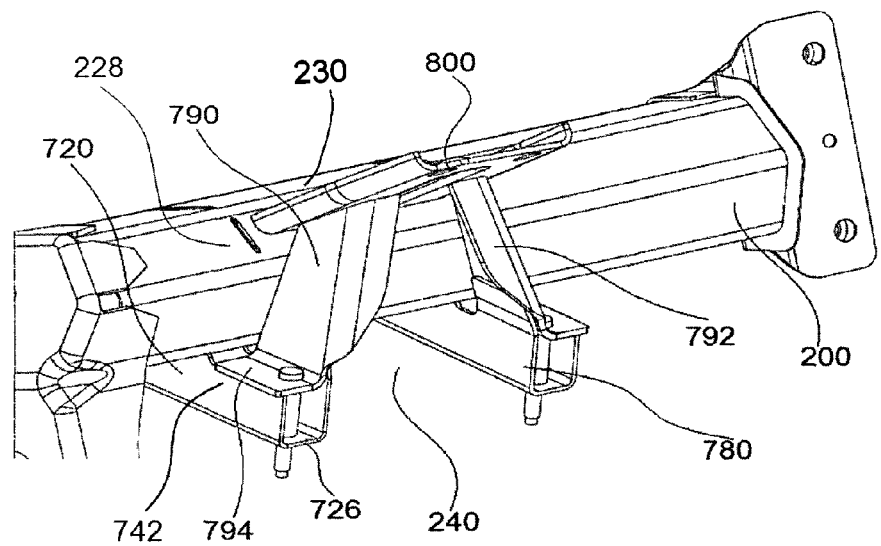
FIG. 12 is another perspective view of the mounting brace assembly shown in FIG. 11.

The mounting brace assembly 710 further includes a pair of cowl top bracket legs 790, 792 coupled to respective second axial ends of the channel beams 720, 780. As best seen FIG. 12, the cowl top bracket leg 790 includes on one end a seating plate 794 welded to a longitudinal seating edge of the plate seat profile section 742, and which is further secured to a longitudinally extending base web 726 using a bolt. The cowl top bracket leg 790 is welded to or supported against the leg support profile section 764. Likewise, the cowl top bracket leg 792 is coupled to the respective second axial end of the channel beam 780 in a manner identical to that of the cowl top bracket leg 790 as described above, such that when welded to the cross-support member 200, the cowl top bracket legs 790, 792 extend at an angle towards the interior mounting region 240 to cooperatively define a cowl top bracket seating surface. A bottom surface of the cowl top coupling bracket 800 is welded to the cowl top bracket legs 790, 792 in seated engagement with the seating surface.

While the invention has been described with reference to preferred embodiments, the invention is not or intended by the applicant to be so limited. A person skilled in the art would readily recognize and incorporate various modifications, additional elements and/or different combinations of the described components consistent with the scope of the invention as described herein.

We claim:

1. A mounting brace assembly adapted for securing a steering column member to a generally transversely extending vehicle cross-support member in a position braced against a vehicle cowl top, the cross-support member including at least one mounting location defining a flange receiving slot, wherein the mounting brace assembly comprises a cowl top bracket for engaging the vehicle cowl top, and at least one mounting base arm extending longitudinally along a base axis from a first axial end portion to a second axial end portion, the mounting brace assembly being positionable in a mounted orientation with the first axial end portion oriented towards a rearward vehicle end for securing the steering column member thereto, and the second axial end portion towards a vehicle forward end, the mounting base arm including a flange member formed as a generally planar anchor flange along the base axis, the anchor flange being sized for generally upward mated insertion in at least part of the flange receiving slot, and the cowl top bracket being coupled to the mounting base arm proximal to the vehicle forward end, and comprising a load transfer portion shaped for juxtaposed abutment with a load bearing portion of the vehicle cowl top, wherein in the mounted orientation, contact between the cowl top bracket and the vehicle cowl top transfers rotational bearing forces from the first axial end portion towards the vehicle cowl top.

2. The mounting brace assembly of claim 1, wherein the mounting location defines two said flange receiving slots in a generally parallel orientation to each other, and the mounting base arm includes a longitudinally elongated base web and two said anchor flanges each integrally joined to an associated lateral edge portion of the base web, each said anchor flanges being sized for generally upward mated insertion in at least part of an associated one of the flange receiving slots.

3. The mounting brace assembly of claim 1, wherein the mounting base arm further comprises a longitudinally elongated base web and an abutment flange, each of the abutment flange and the anchor flange being integrally joined along the base axis to an associated lateral edge portion of the base web, wherein the abutment flange comprises a contact surface portion having a profile selected for complementary juxtaposed abutment against an underside of the cross-support member.

4. The mounting brace assembly of claim 1, wherein the flange receiving slot is cooperatively defined at least by adjoining bottom and forward end walls of the cross-support member, and the anchor flange comprises a bracket attachment surface portion coupled to the cowl top bracket, and an insertion surface portion located to be at least partially received in an interior of the cross-support member, wherein in the mounted orientation, the bracket attachment surface portion projects forwardly from the forward end wall.

5. The mounting brace assembly of claim 4, wherein the anchor flange has a generally triangular shape extending at an angle to the base axis towards the second axial end portion to form the bracket attachment surface portion, the anchor flange tapering towards the first axial end portion to form the insertion surface portion.

6. The mounting brace assembly of claim 4, wherein the mounting base arm further comprises a stop member in the first axial end portion, the stop member being located for resting against a rearward end wall of the cross-support member when the mounting brace assembly is in the mounted orientation to restrict or prevent forward longitudinal movement of the mounting base arm along the base axis.

7. The mounting brace assembly of claim 1, wherein an upper end wall of the cross-support member defines at least one tab receiving slot in generally vertical alignment with the flange receiving slot, and the anchor flange includes at least one substantially co-planar engagement tab sized to be received in the at least one tab receiving slot when the mounting brace assembly is in the mounted orientation.

8. The mounting brace assembly of claim 7, wherein the mounting base arm further comprises a bracket positioning column removably mounted to the second axial end portion, and the cowl top bracket is secured to the bracket positioning column distal to the second axial end portion, the bracket positioning column being sized for positioning the load transfer portion in juxtaposed abutment with the load bearing portion when the mounting brace assembly is in the mounted orientation.

9. The mounting brace assembly of claim 7, wherein the cross-support member defines an elongated interior cavity along a length of the cross-support member, and the anchor flange comprises a profile sized for mated juxtaposition within the elongated interior cavity.

10. The mounting brace assembly of claim 1, wherein the mounting brace assembly comprises two said mounting base arms positionable in the mounted orientation at a distance from each other along a length of the cross-support member, and the cowl top bracket is coupled to one or both of the mounting base arms.

11. The mounting brace assembly of claim 10, wherein the cowl top bracket is formed as a laterally extending cowl top bracket coupled to both said mounting base arms, the cowl top bracket further comprising an abutment edge portion located for substantially abutting contact with an outer surface of the cross-support member.

12. A mounting brace assembly adapted for securing a steering column member to a generally transversely extending vehicle cross-support member in a position braced against a vehicle cowl top, the cross-support member including a pair of mounting locations spaced along a length of the cross-support member to define an inwardly spaced mounting region therebetween, each said mounting location defining a flange receiving slot, wherein the mounting brace assembly comprises a cowl top bracket for engaging the vehicle cowl top, and a pair of mounting base arms, each said mounting base arm extending longitudinally along a base axis from a first axial end portion to a second axial end portion, the mounting brace assembly being positionable in a mounted orientation with the first axial end portion oriented towards a rearward vehicle end for securing the steering column member thereto, and the second axial end portion towards a vehicle forward end, each said mounting base arm including a pair of generally parallel flange members each integrally joined along the base axis to an associated lateral edge of a longitudinally elongated base web:

a first said flange member being formed as an abutment flange distal to the inwardly spaced mounting region, the abutment flange comprising a contact surface portion having a profile selected for complementary juxtaposed abutment against an underside of the cross-support member; and a second said flange member being formed as a generally planar anchor flange proximal to the inwardly spaced mounting region, the anchor flange being sized for mated insertion in at least part of respective said flange receiving slot of an associated one of the mounting locations when the mounting brace assembly is in the mounted orientation; and the cowl top bracket being coupled to one or both said mounting base arms proximal to the vehicle forward end, and comprising a load transfer portion shaped for juxtaposed abutment with a load bearing portion of the vehicle cowl top, wherein in the mounted orientation, contact between the cowl top bracket and the vehicle cowl top transfers rotational bearing forces from the first axial end portion towards the vehicle cowl top.

13. The mounting brace assembly of claim 12, wherein the flange receiving slot is cooperatively defined at least by adjoining bottom and forward end walls of the cross-support member, and the anchor flange comprises a bracket attachment surface portion coupled to the cowl top bracket, and an insertion surface portion located to be at least partially received in an interior of the cross-support member, wherein in the mounted orientation, the bracket attachment surface portion projects forwardly from the forward end wall.

14. The mounting brace assembly of claim 13, wherein the anchor flange has a generally triangular shape extending at an angle to the base axis towards the second axial end portion to form the bracket attachment surface portion, the anchor flange tapering towards the first axial end portion to form the insertion surface portion.

15. The mounting brace assembly of claim 13, wherein the mounting base arm further comprises a stop member in the first axial end portion, the stop member being located for resting against a rearward end wall of the cross-support member when the mounting brace assembly is in the mounted orientation to restrict or prevent forward longitudinal movement of the mounting base arm along the base axis.

16. The mounting brace assembly of claim 12, wherein an upper end wall of the cross-support member defines at each said mounting location at least one tab receiving slot in generally vertical alignment with the respective flange receiving slot, and the anchor flange includes at least one substantially co-planar engagement tab sized to be received in the at least one tab receiving slot when the mounting brace assembly is in the mounted orientation.

17. The mounting brace assembly of claim 16, wherein the mounting base arm further comprises a bracket positioning column removably mounted to the second axial end portion, and the cowl top bracket is secured to the bracket positioning column distal to the second axial end portion, the bracket positioning column being sized for positioning the load transfer portion in juxtaposed abutment with the load bearing portion when the mounting brace assembly is in the mounted orientation.

18. The mounting brace assembly of claim 16, wherein the cross-support member defines an elongated interior cavity along a length of the cross-support member, and the anchor flange comprises a profile sized for mated juxtaposition within the elongated interior cavity.

19. The mounting brace assembly of claim 12, comprising two said cowl top brackets each coupled to an associated one of the mounting base arms.

20. The mounting brace assembly of claim 12, wherein the cowl top bracket is formed as a laterally extending cowl top bracket coupled to both said mounting base arms in the inwardly spaced mounting region, the cowl top bracket further comprising an abutment edge portion located for substantially abutting contact with an outer surface of the cross-support member.

21. The mounting brace assembly of claim 12, wherein the mounting base arm further comprises a mounting plate interposed between the flange members in the first axial end portion, the mounting plate defining a threated bore for complementary threaded engagement with a threaded attachment bolt in the securement of the steering column member thereto.

22. A mounting brace arrangement adapted for securing a steering column member in a position braced against a vehicle cowl top, the mounting brace arrangement comprising a generally transversely extending vehicle cross-support member, a pair of mounting base arms, and a cowl top bracket for engaging the vehicle cowl top, the cross-support member including a pair of mounting locations spaced along a length of the cross-support member to define an inwardly spaced mounting region therebetween, each said mounting location defining a flange receiving slot, each said mounting base arm being coupled to the cross-support member at an associated one of the mounting locations, and extending longitudinally along a base axis from a first axial end portion to a second axial end portion, the mounting brace arrangement being positionable in a mounted orientation with the first axial end portion oriented towards a rearward vehicle end for securing the steering column member thereto, and the second axial end portion towards a vehicle forward end, each said mounting base arm including a pair of generally parallel flange members each integrally joined along the base axis to an associated lateral edge of a longitudinally elongated base web:
  a first said flange member being formed as an abutment flange, the abutment flange comprising a contact surface portion having a profile selected for complementary juxtaposed abutment against an underside of the cross-support member; and
  a second said flange member being formed as a generally planar anchor flange sized for mated insertion in at least part of respective said flange receiving slot of the associated mounting location when the mounting brace arrangement is in the mounted orientation; and
the cowl top bracket being formed as a laterally extending cowl top bracket coupled to both said mounting base arms in the inwardly spaced mounting region forwardly of the cross-support member, wherein the cowl top bracket comprises:
  an abutment edge portion in substantially abutting contact with an outer surface of the cross-support member; and
  a load transfer portion shaped for juxtaposed abutment with a load bearing portion of the vehicle cowl top, wherein in the mounted orientation, contact between the cowl top bracket and the vehicle cowl top transfers rotational bearing forces from the first axial end portion towards the vehicle cowl top.

23. The mounting brace arrangement of claim 22, wherein the abutment flange is disposed distal to the inwardly spaced mounting region, and the anchor flange proximal to the inwardly spaced mounting region.

24. The mounting brace arrangement of claim 22, wherein the flange receiving slot is cooperatively defined at least by adjoining bottom and forward end walls of the cross-support member, and the anchor flange has a generally triangular shape extending at an angle to the base axis towards the second axial end portion to form a bracket attachment surface portion, the anchor flange tapering towards the first axial end portion to form an insertion portion located to be at least partially received in an interior of the cross-support member in the mounted orientation, and wherein the cowl top bracket comprises a generally planar bracket plate having a pair of laterally disposed attachment flanges each coupled to associated said bracket attachment surface portion, the bracket plate having an inclination angle substantially identical to said angle to the base axis.

\* \* \* \* \*